United States Patent
Shirakawa et al.

(10) Patent No.: US 6,764,630 B2
(45) Date of Patent: Jul. 20, 2004

(54) METHOD OF PRODUCING RESIN MOLD

(75) Inventors: Hiroshi Shirakawa, Wako (JP); Isao Nishigaki, Gifu (JP); Masami Kunii, Gifu (JP)

(73) Assignees: Honda Giken Kogyo Kabushiki Kaisha, Tokyo (JP); Forma Co., Ltd., Gifu (JP)

( * ) Notice: Subject to any disclaimer, the term of this patent is extended or adjusted under 35 U.S.C. 154(b) by 91 days.

(21) Appl. No.: 10/226,999

(22) Filed: Aug. 22, 2002

(65) Prior Publication Data
US 2003/0038396 A1 Feb. 27, 2003

(30) Foreign Application Priority Data

Aug. 23, 2001 (JP) ........................................ 2001-253553

(51) Int. Cl.[7] ............................................... B29C 33/40
(52) U.S. Cl. ........................ 264/220; 264/225; 264/278; 264/317
(58) Field of Search ................................ 264/219, 220, 264/225, 278, 317

(56) References Cited

U.S. PATENT DOCUMENTS

| | | | | |
|---|---|---|---|---|
| 4,946,637 A | * | 8/1990 | Masciarelli, Jr. ............ | 264/226 |
| 5,028,291 A | * | 7/1991 | Delgrange et al. .......... | 156/245 |
| 5,039,468 A | * | 8/1991 | Sellers ........................ | 264/225 |
| 6,224,816 B1 | * | 5/2001 | Hull et al. ................... | 264/401 |
| 6,375,880 B1 | * | 4/2002 | Cooper et al. ............... | 264/138 |
| 6,497,834 B1 | * | 12/2002 | Vargo et al. ................. | 264/219 |

FOREIGN PATENT DOCUMENTS

JP          2001-105438          4/2001

* cited by examiner

Primary Examiner—Allan R. Kuhns
(74) Attorney, Agent, or Firm—Merchant & Gould, P.C.

(57) ABSTRACT

A resin (61) as a material of a resin mold is injected in a second resin filling space (57) from a resin injection hole (51) provided in a second back surface reinforcing member (50). When the resin overflows from a resin overflow hole (52), the injection of the resin is stopped, followed by curing of the resin. During the operation of the resin filling step, since a downward load equivalent to a total of a weight of the resin injected in the second resin filling space and the injection pressure is applied to the master model (30), there is a possibility that the master model be deflected downwardly; however, in actual, since the back surface of the master model is overall supported by the temporary filler (59), the master model is not deflected downwardly.

1 Claim, 14 Drawing Sheets

METHOD OF PRODUCING RESIN MOLD

TECHNICAL FIELD

The present invention relates to a method of producing a resin mold which is one kind of easy-to-use mold.

BACKGROUND ART

As molds used for molding resins, there have been generally used metal molds, and in some cases, for example, for trial production or small-quantity production, there have been used resin molds of a type in which a plane facing to a cavity is made from a resin.

For example, a method of producing a resin mold has been described in Japanese Patent Laid-open No. 2001-105438 entitled "Method of Producing Resin Mold". FIGS. 7, 9 and 10 in this document are recited in the following figures.

FIGS. 16(a) to 16(c) are views showing a related art resin mold and a production method thereof described in the above document, wherein FIGS. 16(a), 16(b) and 16(c) are recited from FIGS. 10, 7, and 9 of the above document, respectively. It is to be noted that in FIGS. 16(a) to 16(c), all of parts are denoted by new reference numerals.

FIG. 16(a) is a sectional view of a finished resin mold. A resin mold 100 is composed of a front side mold part 101 and a back side mold part 102. The front side mold part 101 includes a reinforcing member 103 to which a resin layer 104 is provided, and the back side mold part 102 includes a reinforcing member 105 to which a resin layer 106 is provided. A cavity 107 is formed between the resin layers 104 and 106. Accordingly, the resin mold 100 is a mold of a type in which a plane facing to a cavity is made from a resin. A method of producing such a resin mold 100 will be described with reference to FIGS. 16(b) and 16(c).

In the step shown in FIG. 16(b), a master model 110 including clamping lug portions 111 and 112 is clamped between the reinforcing members 103 and 105, and resins 115 and 116 are injected in mold surface forming spaces 113 and 114, respectively.

In the step shown in FIG. 16(c), after the resins 115 and 116 are cured to form the resin layers 104 and 106, the reinforcing members 103 and 105 are separated from each other, to remove the master model 110. By assembling the reinforcing members 103 and 105 in the state that the master model 110 has been removed, the resin mold 100 shown in FIG. 16(a) is obtained.

Referring to FIG. 16(c), as the master model 110, there has been generally used a rapid prototyping model produced by a rapid prototyping process advantageous in easy production. The rapid prototyping model, however, is poor in rigidity, to be thus easily deflected.

As described above, the resins 115 and 116 are injected in the mold surface forming spaces 113 and 114, respectively, in the step shown in FIG. 16(b). In this step, a deviation of injection timing or the like inevitably occurs, to deflect the master model 110 rightwardly or leftwardly. To prevent such deflection of the master model 110, supporting members 117 and 118 are inserted as shown in the figure; however, portions, apart from these supporting members 117 and 118, of the master model 110 are defected. If the master model 110 is deflected, the shape of the cavity 107 shown in FIG. 16(a) becomes inaccurate, with a result that the finishing accuracy of a molded product is degraded.

An object of the present invention is to provide a method of producing a resin mold, which is capable of preventing a master model from being deflected.

DISCLOSURE OF THE INVENTION

To achieve the above object, according to an invention described in claim 1, there is provided a method of producing a resin mold, characterized by including the steps of preparing a master model having a shape corresponding to a product shape and including a clamping lug portion at a periphery of the master model, and a first back surface reinforcing member and a second back surface reinforcing member; clamping the master model between the first and second back surface reinforcing members in a state that a first resin filling space is kept between the master model except the clamping lug portion and the first back surface reinforcing member and a second resin filling space is kept between the master model except the clamping lug portion and the second back surface reinforcing member; filling the first resin filling space with a temporary filler, the temporary filler being adapted to be easily injected in or discharged out of the first resin filling space; filling the second resin filling space with a resin as a material of the resin mold, and curing the resin; discharging the temporary filler from the first resin filling space; filling the first resin filling space with a resin as a material of the resin mold, and curing the resin; and removing the master model.

The back surface of the master model is supported by the temporary filler having been injected to fill the first resin filling space. In such a state, a resin as a material of the resin mold is injected to fill the second resin filling space. Subsequently, in the state that the back surface of the master model is supported by the resin having been injected to fill the second resin filling space, a resin as a material of the resin mold is injected to fill the first resin filling space. In this way, at the time of filling the space with a resin as a material of the resin mold, since the back surface of the master model is supported by the temporary filler or the resin as a material of the resin mold having been injected to fill the opposed space, the master model is prevented from being deflected. As a result, it is possible to obtain a cavity with a high accuracy, and hence to obtain a molded product having a desirable shape.

BEST MODE FOR CARRYING OUT THE INVENTION

Hereinafter, an embodiment of the present invention will be described with reference to the accompanying drawings. It is to be noted that the drawings should be viewed in the direction of characters.

Figure 1:
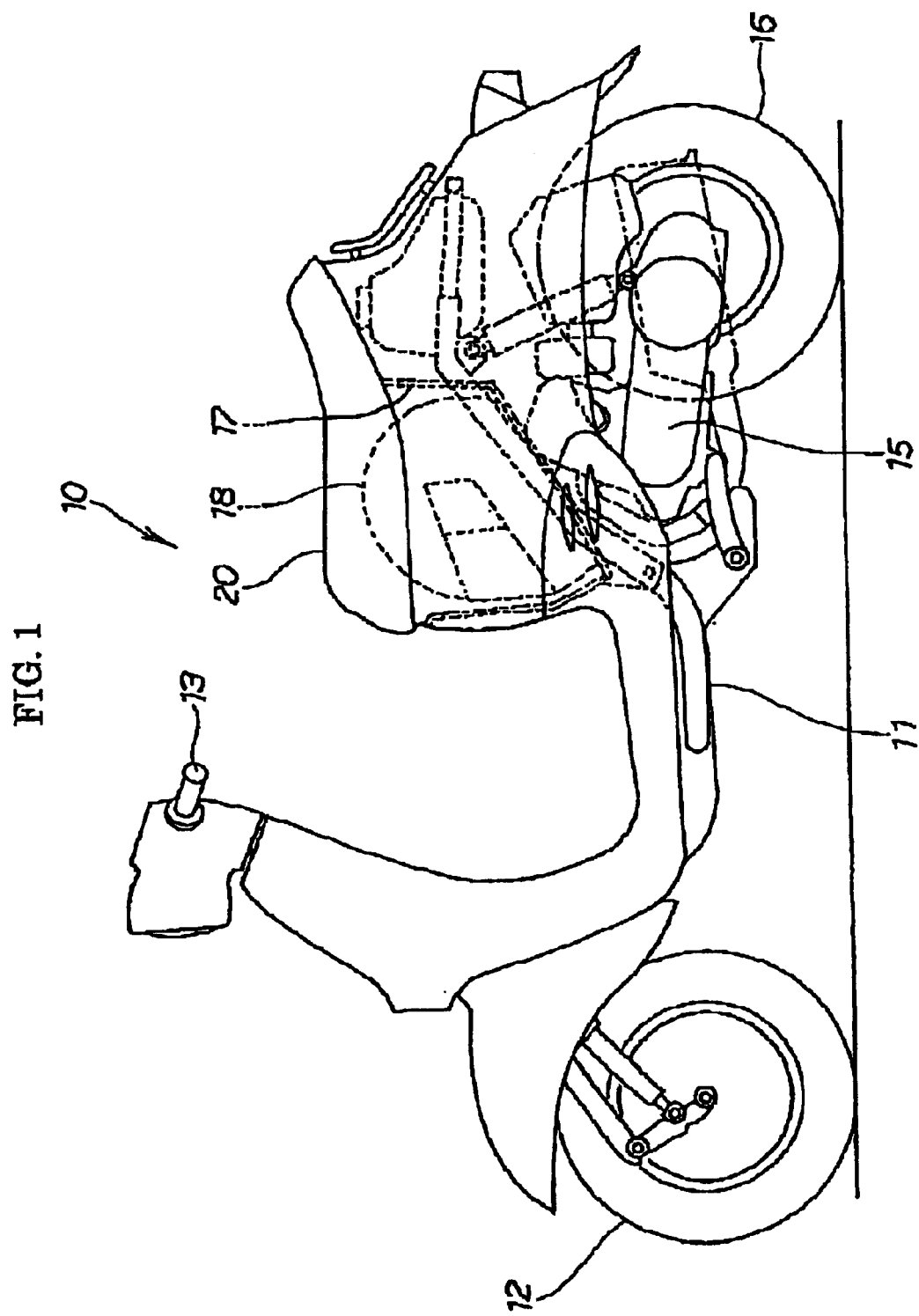
FIG. 1 is a side view of a scooter type motorcycle to which the present invention is applied.

FIG. 1 is a side view of a scooter type motorcycle to which the present invention is applied. A scooter type motorcycle 10 is a vehicle including a body frame 11. A front wheel 12 and a handlebar 13 are provided on a front portion of the body frame 11. A rear wheel 16 is provided, via a swing type power unit 15, on a rear portion of the body frame 11. A luggage box 17 and a seat 20 are provided nearly above the rear wheel 16. The luggage box 17 is a large-sized housing box capable of housing a helmet 18, wherein the helmet 18 is taken in or out of the luggage box 17 by opening the seat 20.

Figure 2:
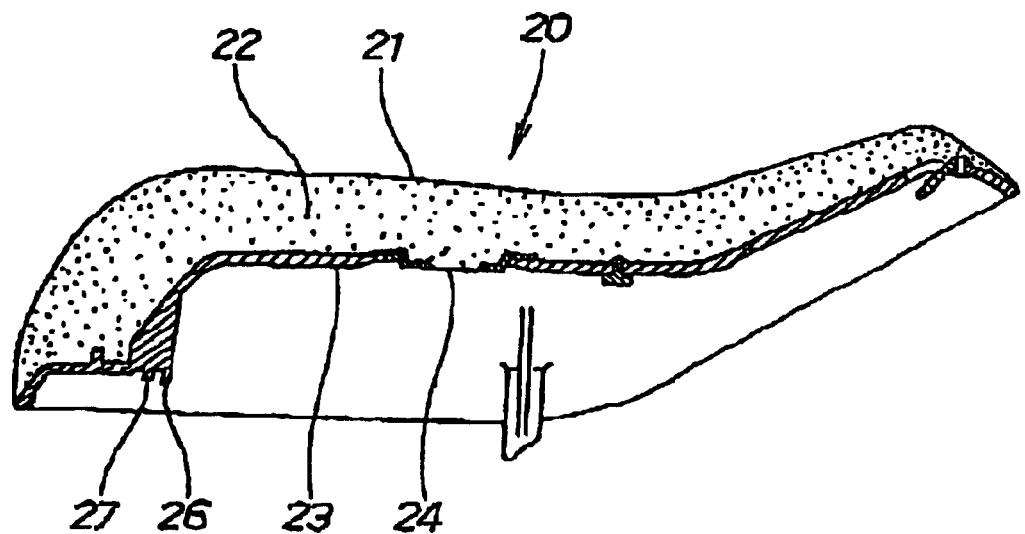
FIG. 2 is a sectional view of a sheet to which the present invention is applied.

FIG. 2 is a sectional view of the seat to which the present invention is applied. The seat 20 includes a skin 21, a cushion member 22 made from sponge, and a seat bottom plate 23 formed by a resin-molded product. The seat bottom plate 23 is a rigid member for receiving the body weight of a driver via the cushion member 22 and the skin 21.

Figure 3:
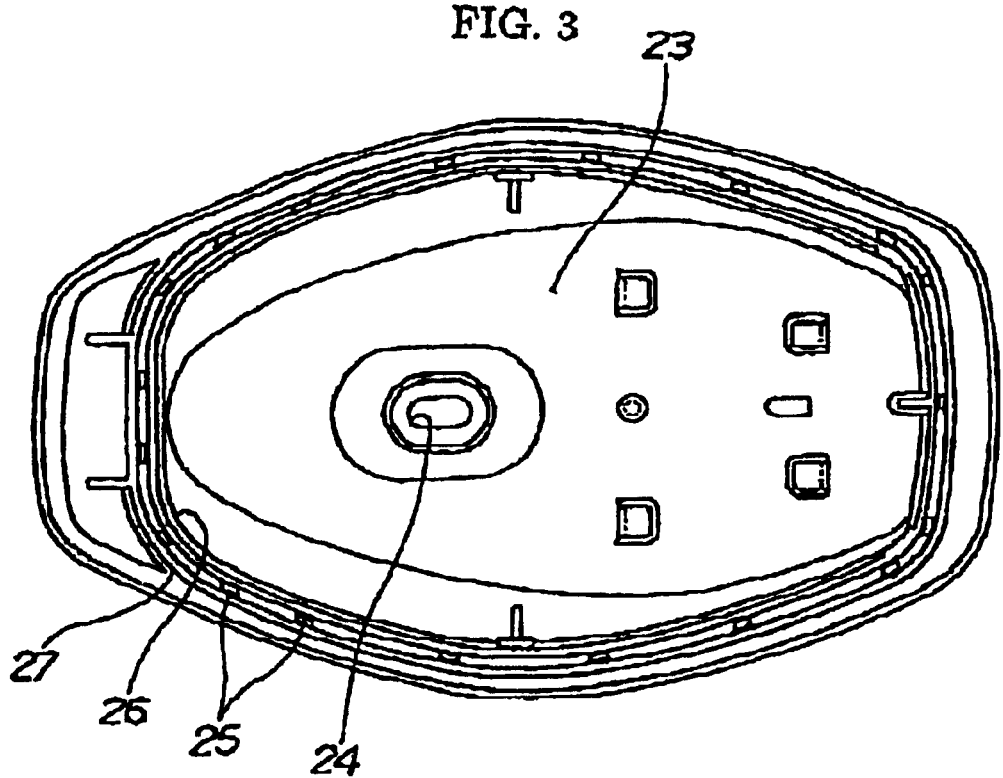
FIG. 3 is a bottom view of the sheet to which the present invention is applied.

FIG. 3 is a bottom plate of the sheet to which the present invention is applied. The sheet bottom plate 23 is a member formed into a complicated, approximately elliptic shape including a helmet holder 24, a plurality of through-holes 25 . . . (symbol " . . . " denotes a plural number, the same applying in the following) and projecting rib portions 26 and 27 formed to surround the through-holes 25 . . . . The sheet bottom plate 23 is produced by a resin-molding process using a mold.

Figure 4:
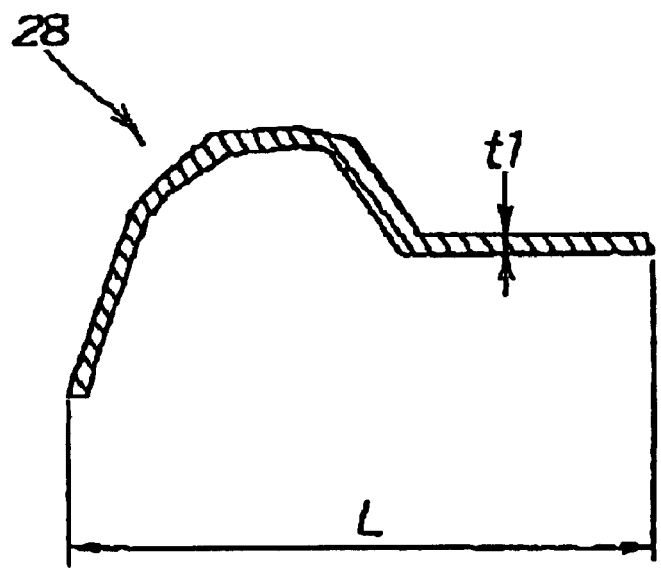
FIG. 4 is a sectional view of a sheet bottom plate to which the present invention is applied.

FIG. 4 is a sectional view of the sheet bottom plate to which the present invention is applied. It is to be noted that a cross-sectional shape of a sheet bottom plate shown in this figure is depicted more simply than that of the sheet bottom plate 23 shown in FIG. 2 for convenience of description, and therefore, the sheet bottom plate in this figure is newly denoted by reference numeral 28. The overall length of the sheet bottom plate 28 is taken as L, and a representative thickness thereof is taken as t1.

Figure 5:
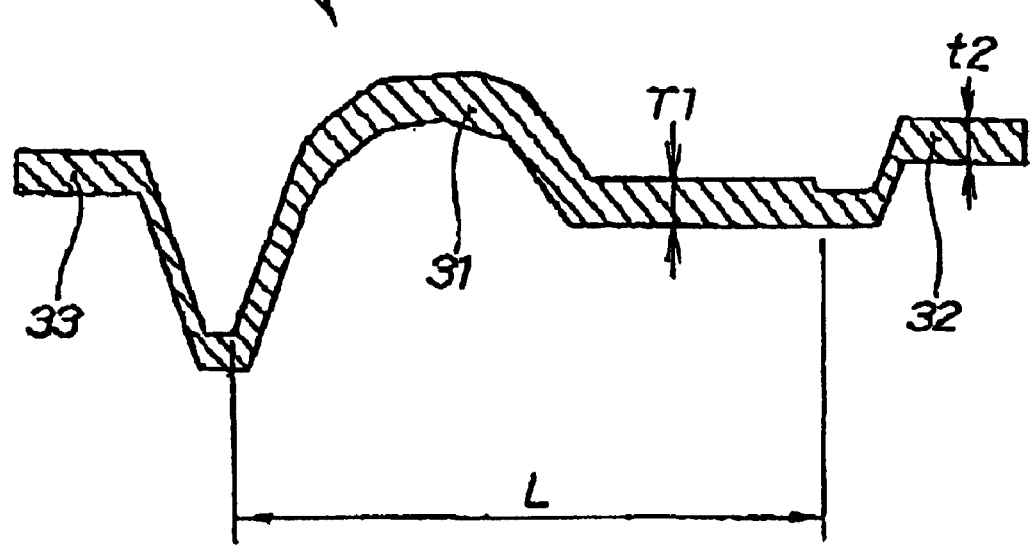
FIG. 5 is a sectional view of a master model used for the present invention.

FIG. 5 is a sectional view of a master model used for the present invention. A master model 30 is a model having such a cross-section that two clamping lug portions 32 and 33 are protruded from both ends of a model portion 31 having a length of L.

Letting the thickness of the clamping lug portion 32 be t2, the total of the thickness t1 shown in FIG. 4 and the thickness t2 becomes a representative thickness T1 of the model portion 31. Accordingly, the master model 30 is larger than the sheet bottom plate 28 shown in FIG. 4.

A preferable master model 30 is a resin model produced by a rapid prototyping process. The rapid prototyping process is advantageous in producing a model for a short time. The master model 30, however, may be produced by any other production process. Alternatively, the master model 30 may be made from a material other than a resin, for example, a light metal.

A method of producing a resin mold using the master model 30 will be described below.

Figure 6:
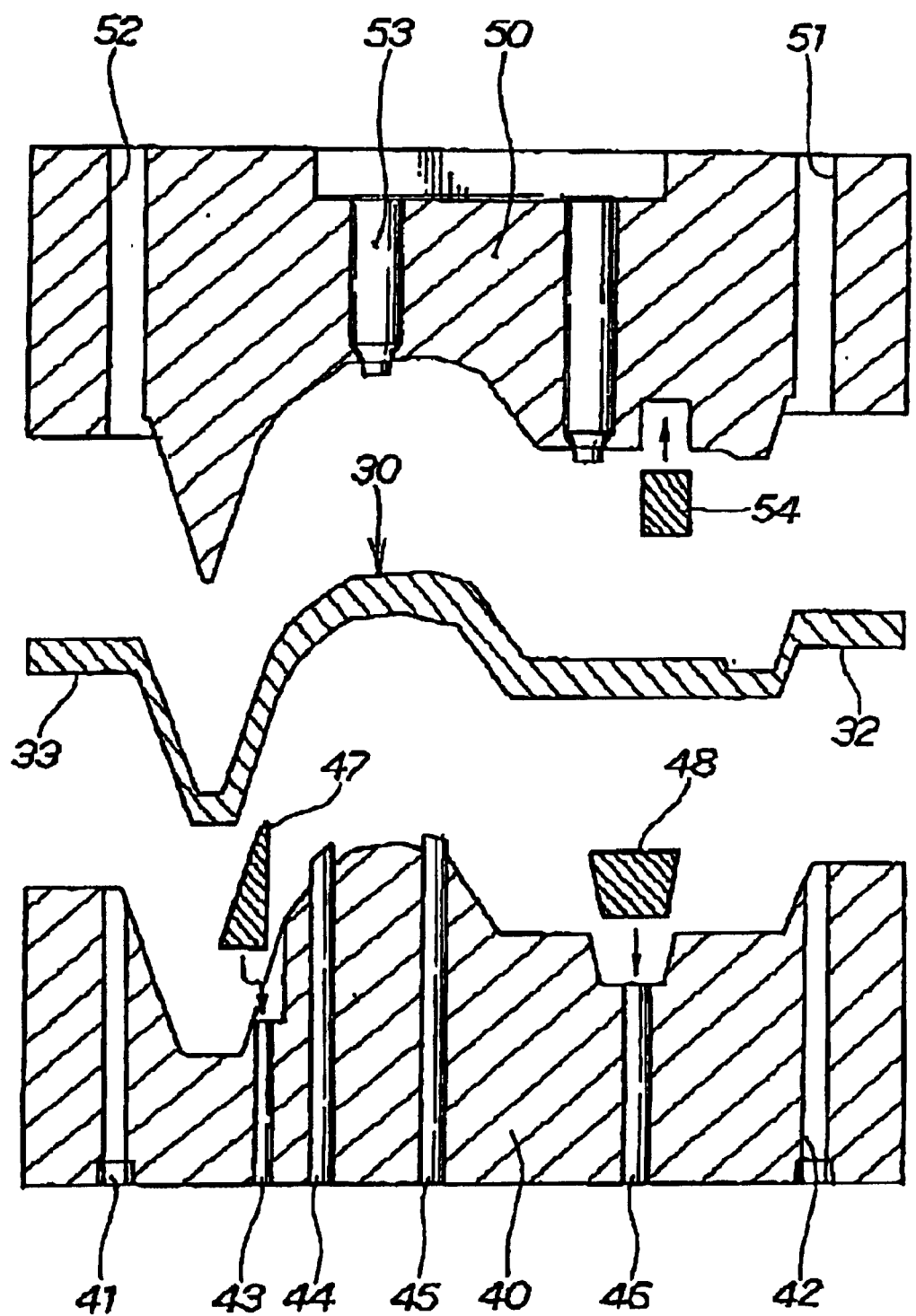
FIG. 6 is a view illustrating a preparation step according to the present invention.

FIG. 6 is a view illustrating a preparation step according to the present invention. In this step, a first back surface reinforcing member 40 is prepared. The first back surface reinforcing member 40 includes a temporary filler injection hole/resin injection hole 41, a temporary filler overflow hole/rein overflow hole 42, various ejector pins 43, 44, 45, and 46, and inserts 47 and 48.

The first back surface reinforcing member 40 is preferably made from an aluminum-copper based zinc alloy called ZAS, ZAC, or AZ4 (each of which is a registered trade name). An aluminum-copper based zinc alloy containing 4.1 wt % of aluminum, 3.0 wt % of copper, and 0.04 wt % of magnesium, the balance being zinc has a Vickers hardness (hereinafter, abbreviated as Hv) of about 100 kg/mm$^2$, which is as large as about two times or more the hardness (Hv: 43 kg/mm$^2$) of an epoxy resin.

The hardness of a cast iron (FC300), which has been generally used for a back surface reinforcing member, is as large as Hv=about 240 kg/mm$^2$; however, since a melting point of the cast iron is as high as 1300ÿ or more, high temperature works are required for melting and casting the cast iron. On the contrary, since the above-described aluminum-copper based zinc alloy has a melting point being as low as about 380ÿ, the alloy can be very easily cast.

In this way, the above-described aluminum-copper based zinc alloy typically called ZAS advantageously has both a suitable hardness (rigidity) and a low melting point.

In the step shown in FIG. 6, a second back surface reinforcing member 50 is then prepared. The second back surface reinforcing member 50 includes a resin injection hole 51, a resin overflow hole 52, a sprue bush 53, and an insert 54. The second back surface reinforcing member 50 is also preferably made from the above-described aluminum-copper based zinc alloy typically called ZAS.

In the step shown in FIG. 6, the master model 30 having the shape corresponding to that of a product and including the clamping lug portions 32 and 33, and the first back surface reinforcing member 40 and the second back surface reinforcing member 50 are thus prepared.

Figure 7:
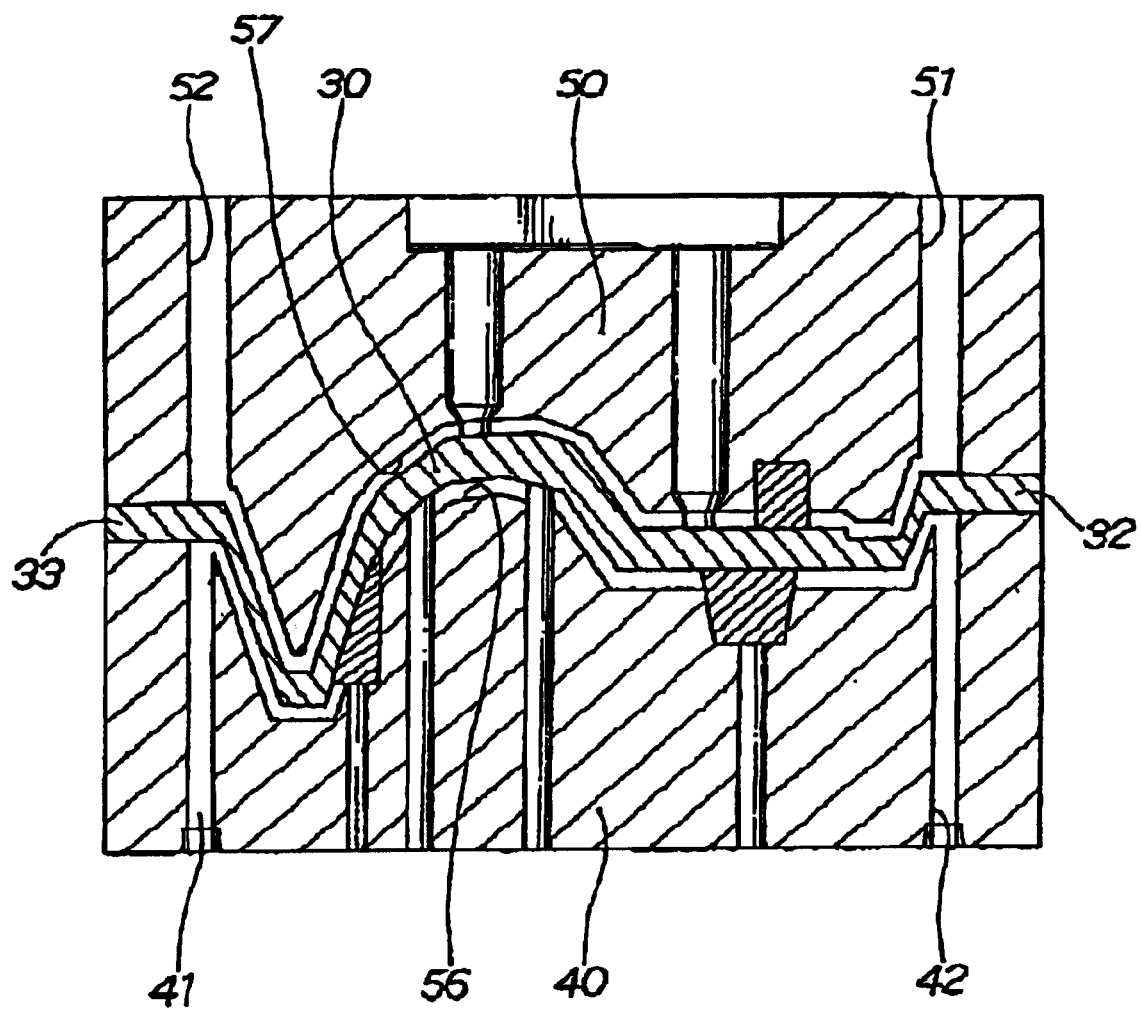
FIG. 7 is a master model clamping step according to the present invention.

FIG. 7 is a view illustrating a master model clamping step according to the present invention. In this step, the master model 30 is clamped between the first back surface reinforcing member 40 and the second back surface reinforcing member 50. Here, it is important that a first resin filling space 56 having a specific thickness is put between the master model 30 and the first back surface reinforcing member 40 and a second resin filling space 57 having a specific thickness is put between the master model 30 and the second back surface reinforcing member 50.

As a result of setting the first and second resin filling spaces 56 and 57, only the clamping lug portions 32 and 33 of the master model 30 are clamped between the first and second back surface reinforcing members 40 and 50.

Figure 8:
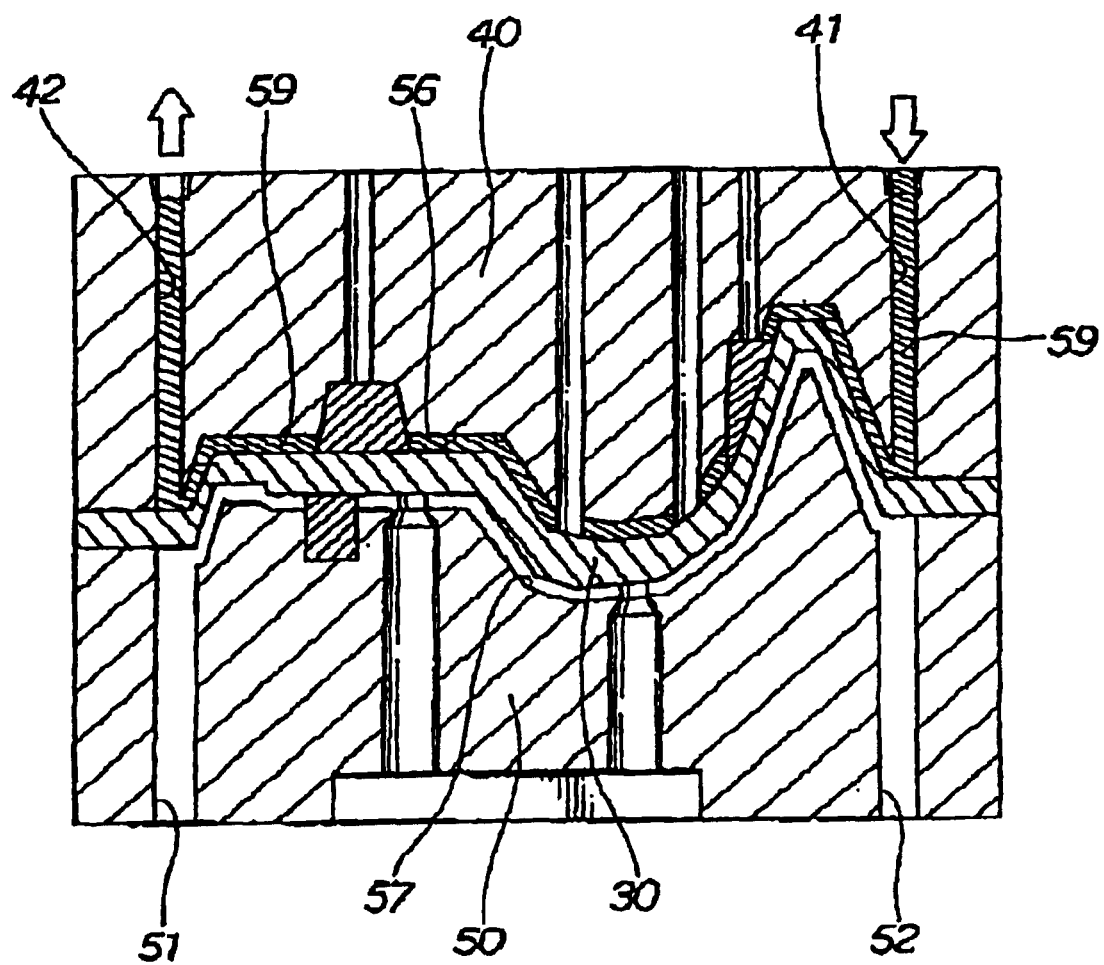
FIG. 8 is a view illustrating a temporary filler filling step according to the present invention.

FIG. 8 is a view illustrating a temporary filler filling step according to the present invention. In this step, the assembled body shown in FIG. 7 is reversed such that the first back surface reinforcing member 40 is positioned on the upper side and the second back surface reinforcing member 50 is positioned on the lower side. A temporary filler 59 such as beads, silicon based clay, or a resin is injected in the first resin filing space 56 from the temporary filler injection hole/resin injection hole 41 provided in the first back surface reinforcing member 40. When the temporary filler 59 overflows from the temporary filler overflow hole/resin overflow hole 42, the injection of the temporary filler 59 is stopped. A plug (not shown) is screwed or pressed in each of the temporary filler injection hole/resin injection hole 41 and the temporary filler overflow hole/resin overflow hole 42, to enclose the temporary filler 59 in the first resin filling space 56.

Figure 9:
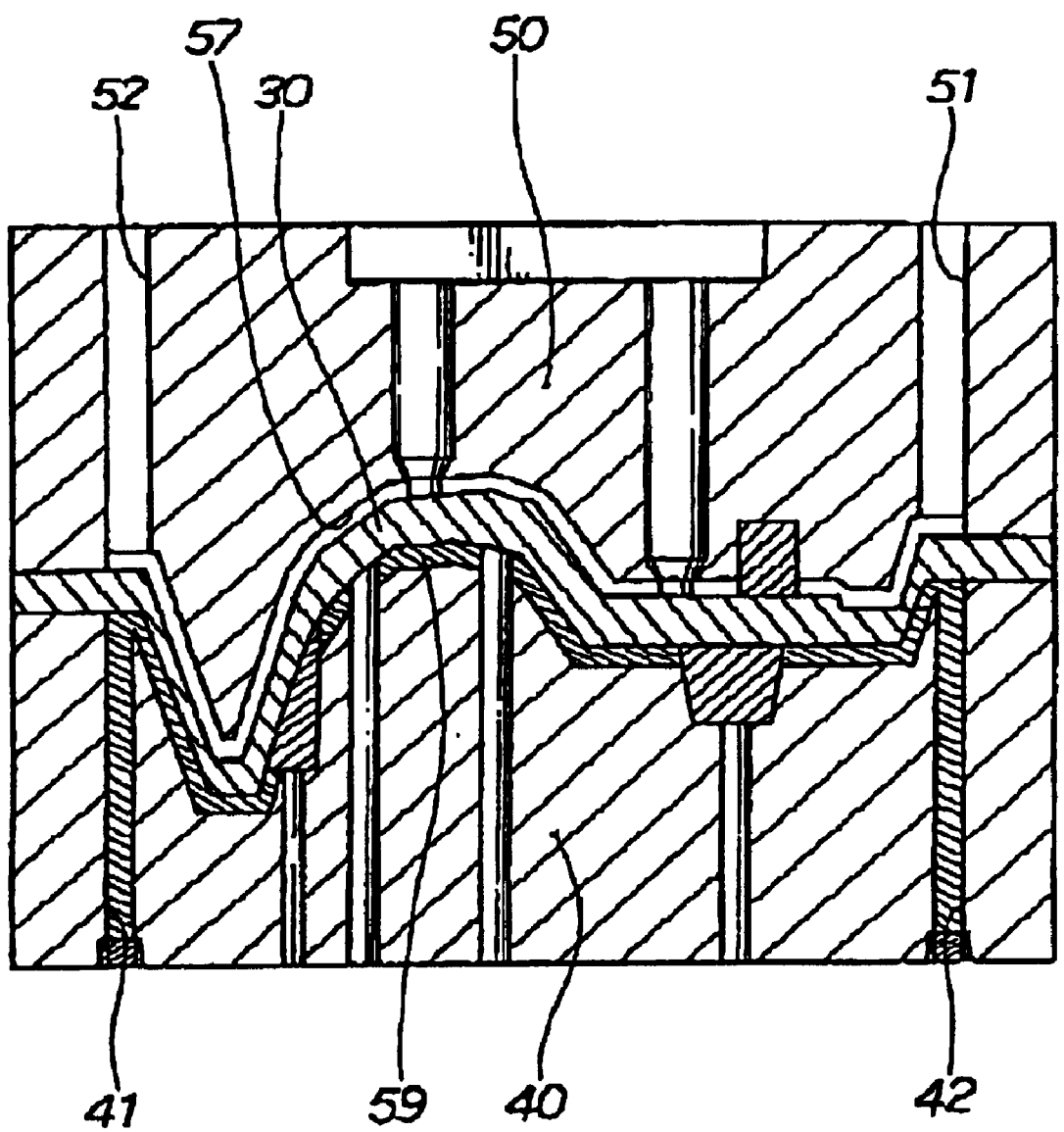
FIG. 9 is a view showing reversal of an assembled body according to the present invention.

FIG. 9 is a view showing reversal of the assembled body according to the present invention. As shown in this figure, the assembled body shown in FIG. 8 is reversed such that the temporary filler 59 is positioned on the lower side and the second resin filling space 57 is positioned on the upper side.

Figure 10:
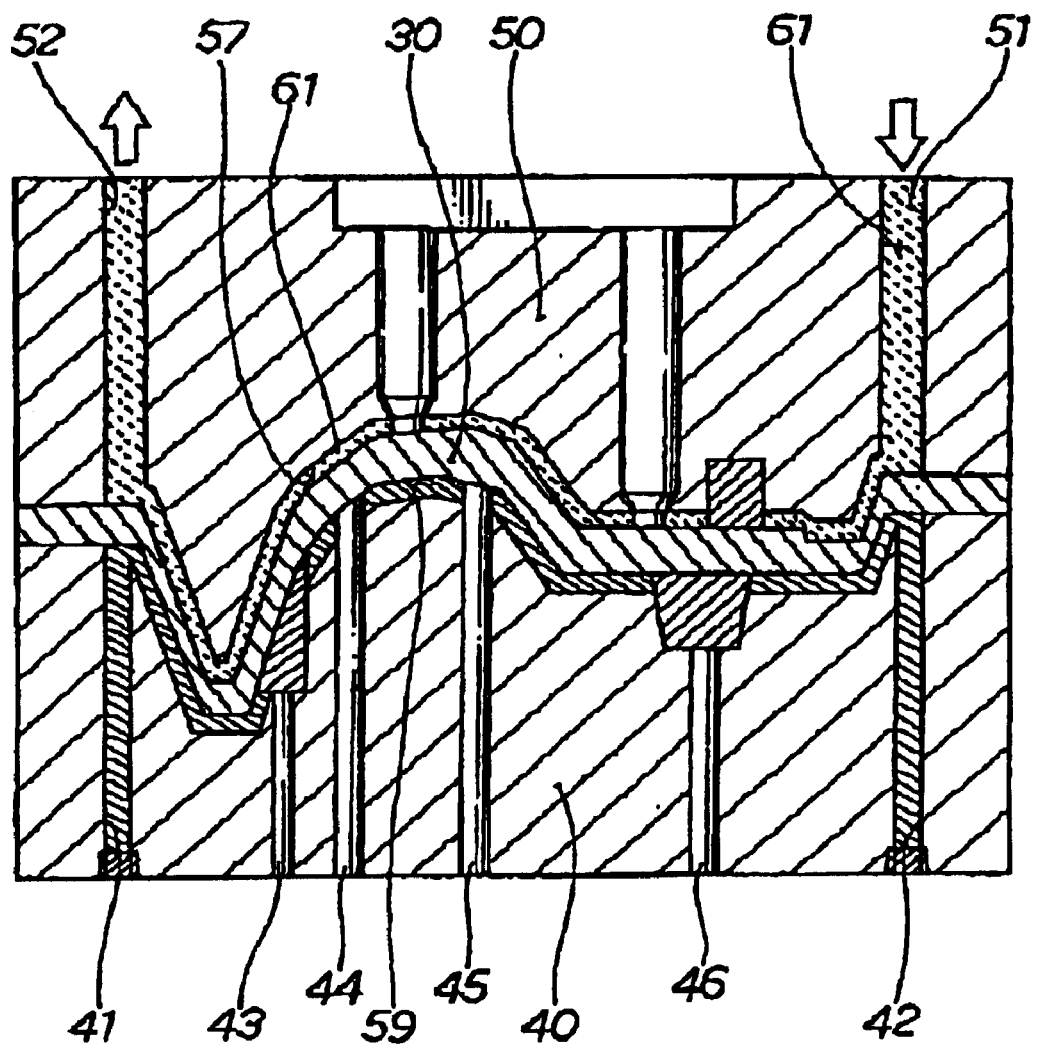
FIG. 10 is a view illustrating a resin filling step according to the present invention, in which a second resin filling space is filled with a resin as a material of a resin mold to be produced.

FIG. 10 is a view illustrating a resin filling step according to the present invention, in which the second resin filling space is filled with a resin as a material of a resin mold to be produced. In this step, a resin 61 as a material of a resin mold to be produced, which resin contains an epoxy resin and a powder of metal as basic components and also contains a filler as an additional component, is injected in the second resin filling space 57 from the resin injection hole 51 provided in the second back surface reinforcing member 50. When the resin 61 overflows from the resin overflow hole 52, the injection of the resin 61 is stopped, followed by curing of the resin 61.

The powder of a metal contained in the resin 61 may be a powder of a metal such as aluminum, copper, iron, or nickel, or a powder of an alloy containing the metal as a main component.

The filler contained in the resin 61 is basically used in the form of fibers, and the material of the filler may be carbon, aramid resin, polyimide, a ceramic material, a metal material, or a material equivalent thereto.

During the above-described operation of the resin filling step, since a downward load equivalent to a total of a weight of the resin 61 injected in the second resin filling space 57 and the injection pressure is applied to the master model 30, there is a possibility that the master model 30 be deflected downwardly; however, in actual, since the back surface of the master model 30 is overall supported by the temporary filler 59, the master model 30 is not deflected downwardly.

As a result, during the operation of the resin filling step, the thickness of the second resin filling space 57 does not extend, so that the thickness of a layer of the resin 61 injected in the second resin filling space 57 can be set to a specific thickness.

Figure 11:
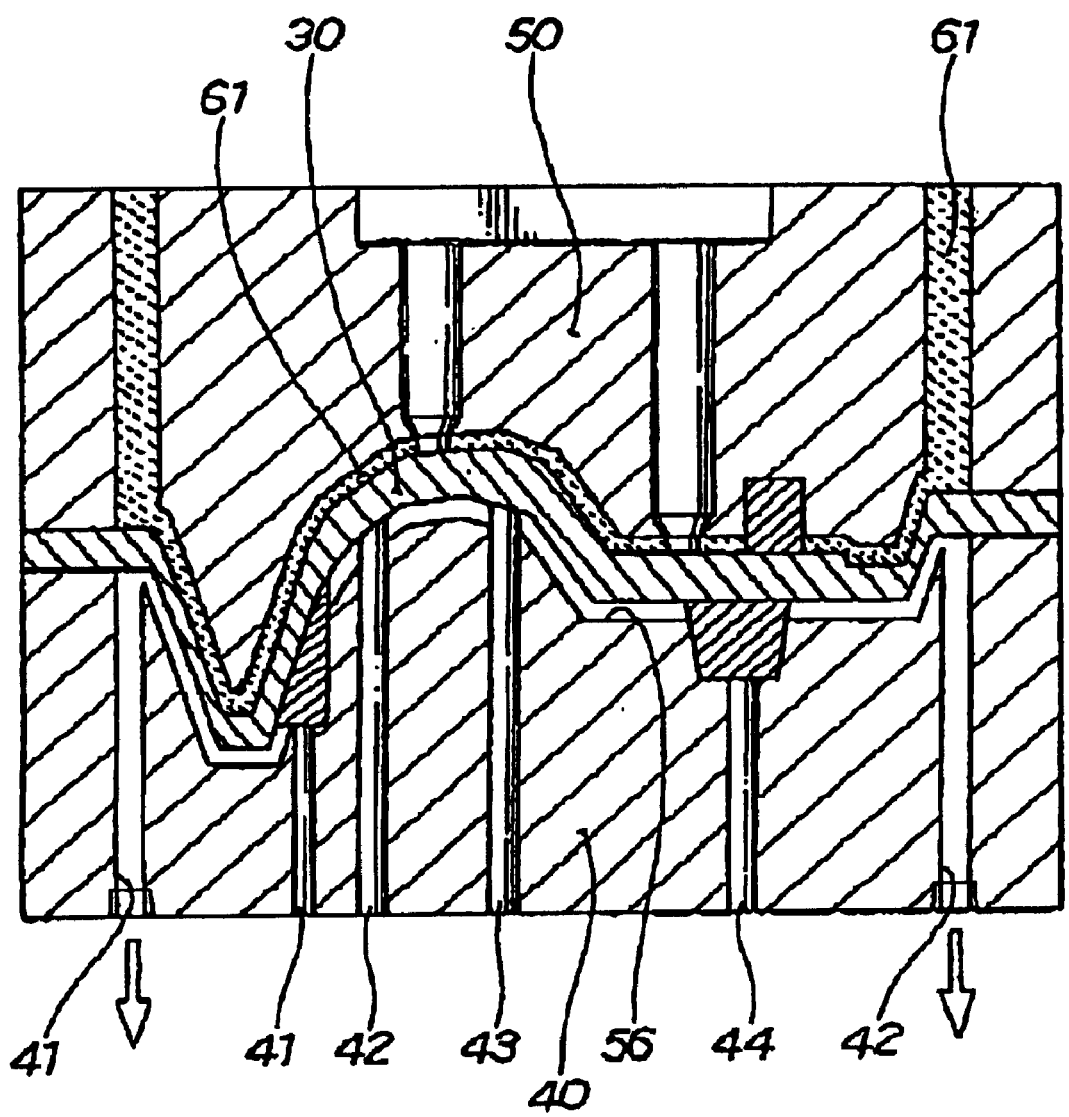
FIG. 11 is a view illustrating a temporary filler discharging step according to the present invention.

FIG. 11 is a view illustrating a temporary filler discharging step according to the present invention. In this step, the temporary filler 59 (see FIG. 10) is discharged from the first resin filling space 56 by removing the plugs (not shown). Concretely, if the temporary filler 59 is in the form of beads, it may be discharged by tilting the assembled body while imparting a mechanical vibration thereto, and if the temporary filler 59 is in the form of a thermally-fluidized material, it may be discharged by tilting the assembled body while heating the first back surface reinforcing member 40.

Figure 12:
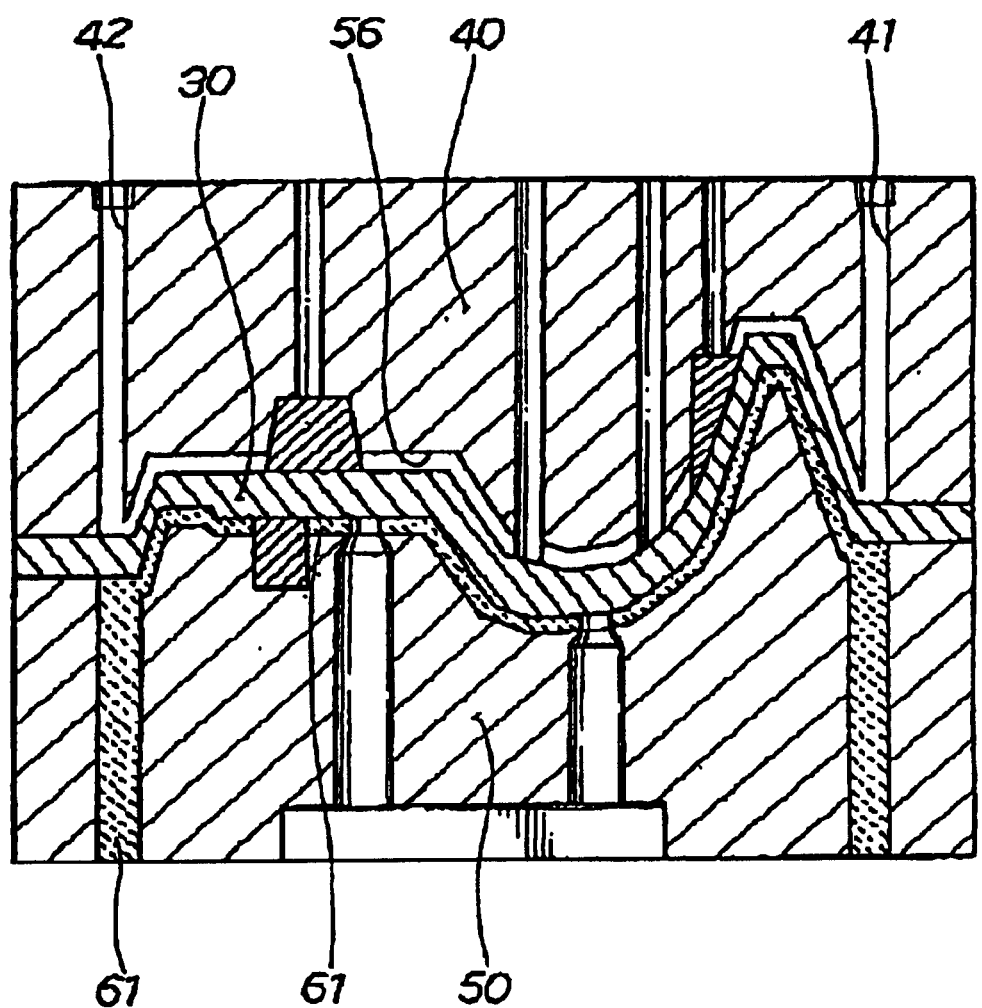
FIG. 12 is a view showing further reversal of the assembled body according to the present invention.

FIG. 12 is a view showing further reversal of the assembled body according to the present invention. As shown in this figure, the assembled body shown in FIG. 11 is reversed such that the first resin filling space 56 is positioned on the upper side and the layer of the resin 61, which has been injected to fill the second resin filling space 57, is positioned on the lower side.

Figure 13:
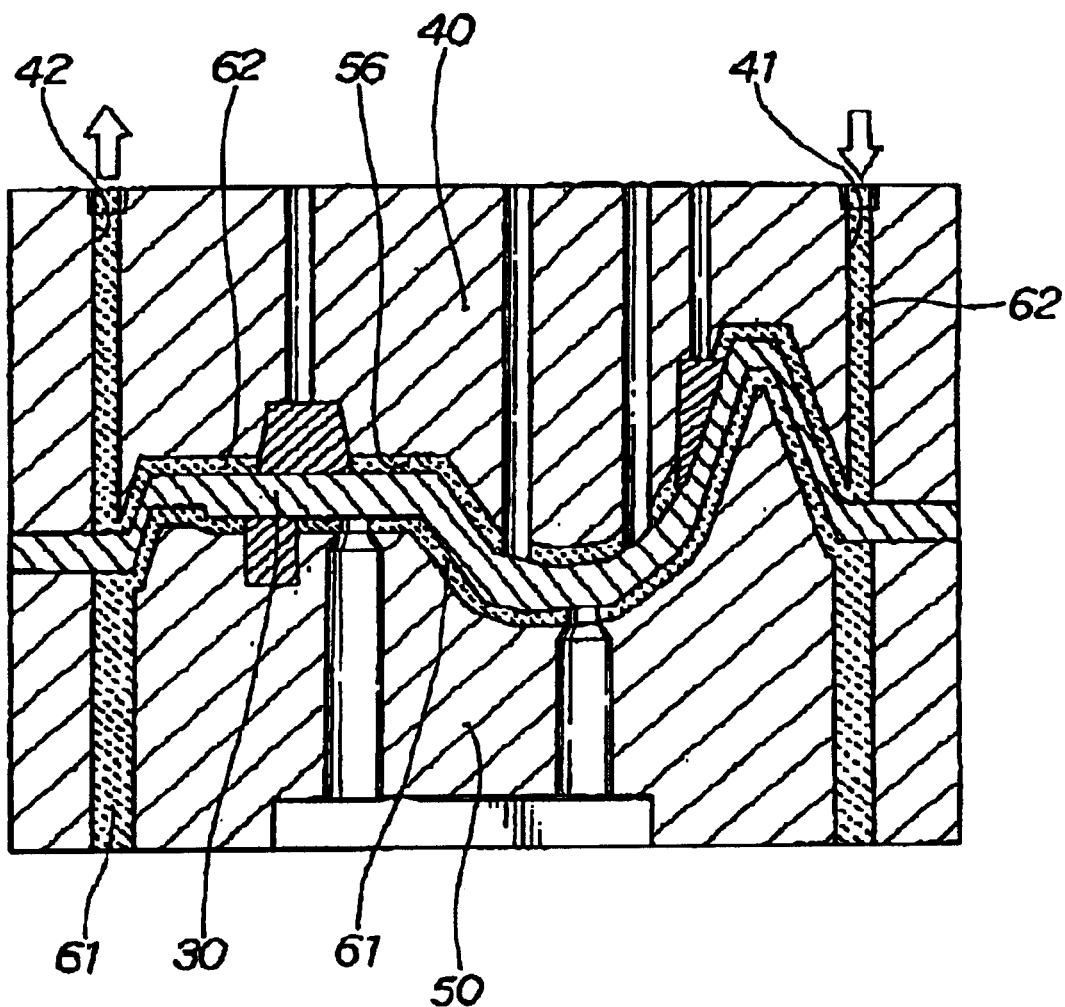
FIG. 13 is a view illustrating a resin filling step according to the present invention, in which a first resin filling space is filled with a resin as a material of a resin mold to be produced.

FIG. 13 is a view illustrating a resin filling step according to the present invention, in which the first resin filling space is filled with a resin as a material of a resin mold to be produced. In this step, a resin 62 as a material of a resin mold to be produced, which contains an epoxy resin and a powder of metal as basic components and also contains a filler as an additional component, is injected in the first resin filling space 56 from the temporary filler injection hole/resin injection hole 41 provided in the first back surface reinforcing member 40. When the resin 62 overflows from the temporary filler overflow hole/resin overflow hole 42, the injection of the resin 62 is stopped, followed by curing of the resin 62.

The powder of a metal contained in the resin 62 may be a powder of a metal such as aluminum, copper, iron, or nickel, or a powder of an alloy containing the metal as a main component.

The filler contained in the resin 61 is basically used in the form of fibers, and the material of the filler may be carbon, aramid resin, polyimide, a ceramic material, a metal material, or a material equivalent thereto.

During the above-described operation of the resin filling step, since a downward load equivalent to a total of a weight of the resin 62 injected in the first resin filling space 56 and the injection pressure is applied to the master model 30, there is a possibility that the master model 30 be deflected downwardly; however, in actual, since the back surface of the master model 30 is overall supported by the layer of the resin 61 having been injected to fill the second resin filling space 57 and cured, the master model 30 is not deflected downwardly.

As a result, during the operation of the resin filling step, the thickness of the first resin filling space 56 does not extend, so that the thickness of a layer of the resin 62 injected in the second resin filling space 56 can be set to a specific thickness.

Figure 14:
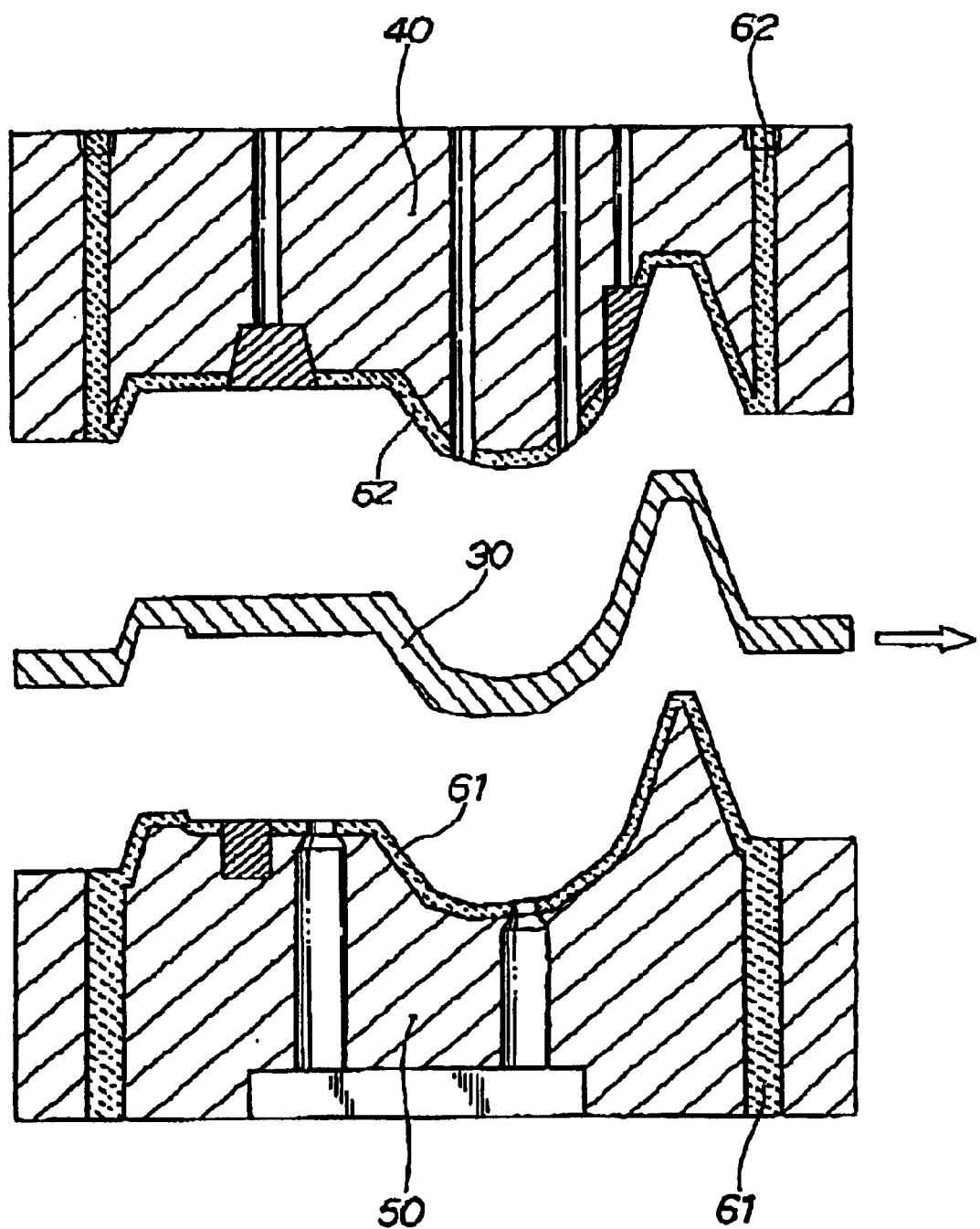
FIG. 14 is a view illustrating a master model removing step according to the present invention.

FIG. 14 is a view illustrating a master model removing step according to the present invention. In this step, the master model 30 is removed by separating the first and second back surface reinforcing members 40 and 50 from each other. After the removal of the master model 30, the layer of the resin 62 supported by the first back surface reinforcing member 40 and the layer of the resin 61 supported by the second back surface reinforcing member 50 are assembled, to finish a resin mold shown in FIG. 15.

Figure 15:
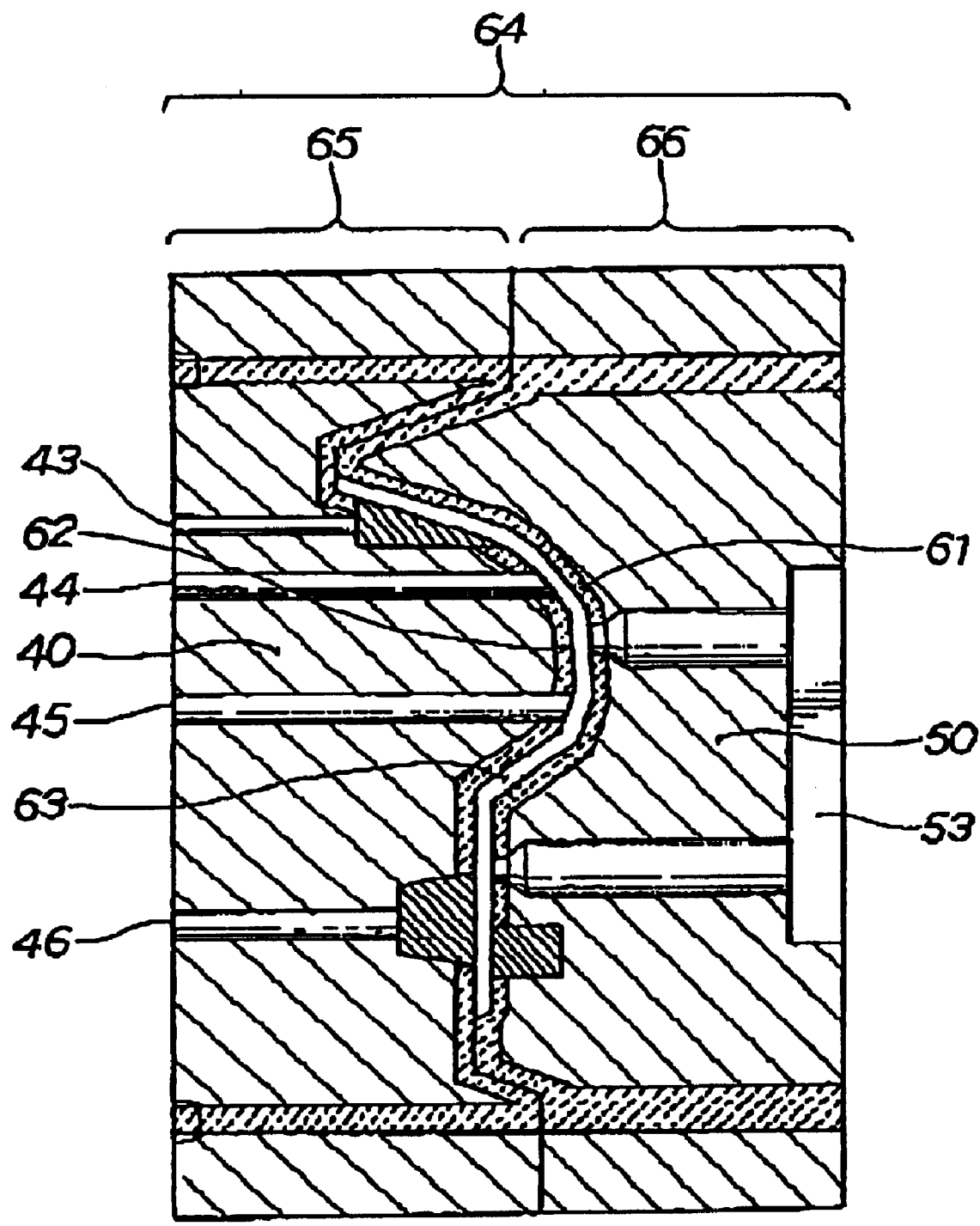
FIG. 15 is a sectional view of a resin mold produced according to the present invention.
Figure 16A:
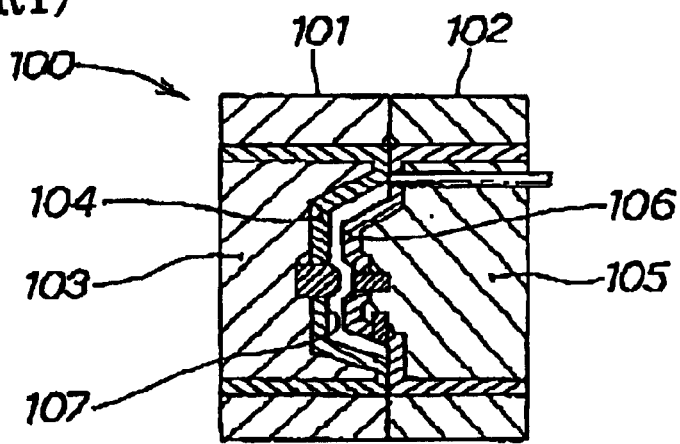
FIGS. 16(a) to 16(c) are views showing a related art resin mold and a production method thereof.
Figure 16B:
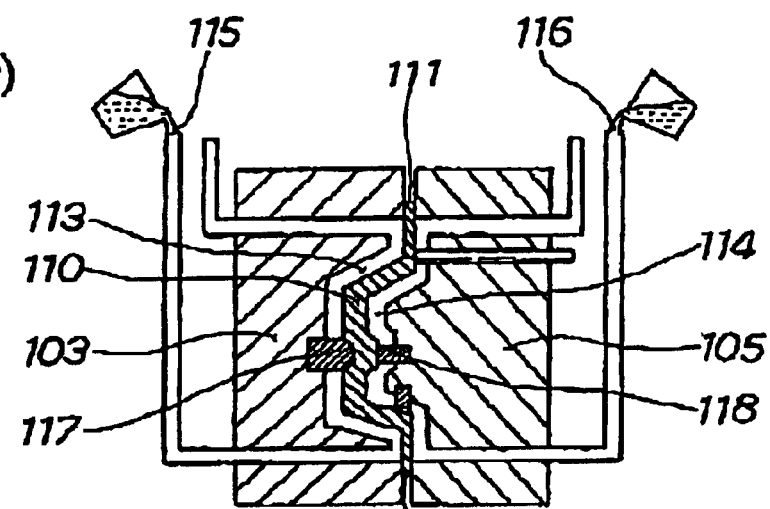
Figure 16C:
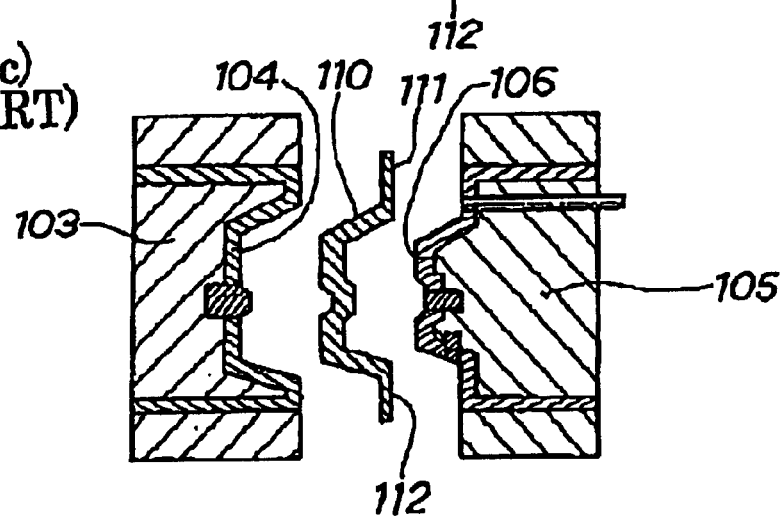

FIG. 15 is a sectional view of a resin mold produced according to the present invention. A resin mold 64 is composed of a movable mold part 65 and a fixed mold part 66. The movable mold part 65 is configured such that a portion facing to a cavity 63 is made from the resin 62, and the layer of the resin 62 is reinforced by the first back surface reinforcing member 40. The fixed mold part 66 is configured such that a portion facing to the cavity 63 is made from the resin 61 and the layer of the resin 61 is reinforced by the second back surface reinforcing member 50.

A sheet bottom plate having the same configuration as that of the sheet bottom plate 23 shown in FIG. 4 can be obtained by injecting a molten resin in the cavity 63 via the sprue bush 53, and projecting, after solidification of the resin, the solidified resin by means of the ejector pins 43 to 46.

A product (molded product) produced by using the resin mold produced by the method of the present invention is not limited to a sheet bottom plate but may be any kind of plastic product.

INDUSTRIAL APPLICABILITY

The present invention configured as described above exhibits the following effect:

According to the invention described in claim 1, at the time of filling a space with a resin as a material of a resin mold, since the back surface of the master model is supported by the temporary filler or a resin as a material of the resin mold having been injected to fill the opposed space, the master model is prevented from being deflected. As a result, it is possible to obtain a cavity with a high accuracy, and hence to obtain a molded product having a desirable shape.

What is claimed is:

1. A method of producing a resin mold, characterized by including the steps of:

preparing a master model having a shape corresponding to a product shape and including a clamping lug portion at a periphery of said master model, and a first back surface reinforcing member and a second back surface reinforcing member;

clamping said master model between said first and second back surface reinforcing members in a state that a first resin filling space is kept between said master model except said clamping lug portion and said first back surface reinforcing member and a second resin filling space is kept between said master model except said clamping lug portion and said second back surface reinforcing member;

filling said first resin filling space with a temporary filler, said temporary filler being adapted to be easily injected in or discharged out of said first resin filling space;

filling said second resin filling space with a resin as a material of said resin mold, and curing said resin;

discharging said temporary filler from said first resin filling space;

filling said first resin filling space with a resin as a material of said resin mold, and curing said resin; and removing said master model.

* * * * *